(No Model.)
J. J. STEPHENS.
INSTRUMENT FOR MEASURING POWDERS.
No. 343,776. Patented June 15, 1886.
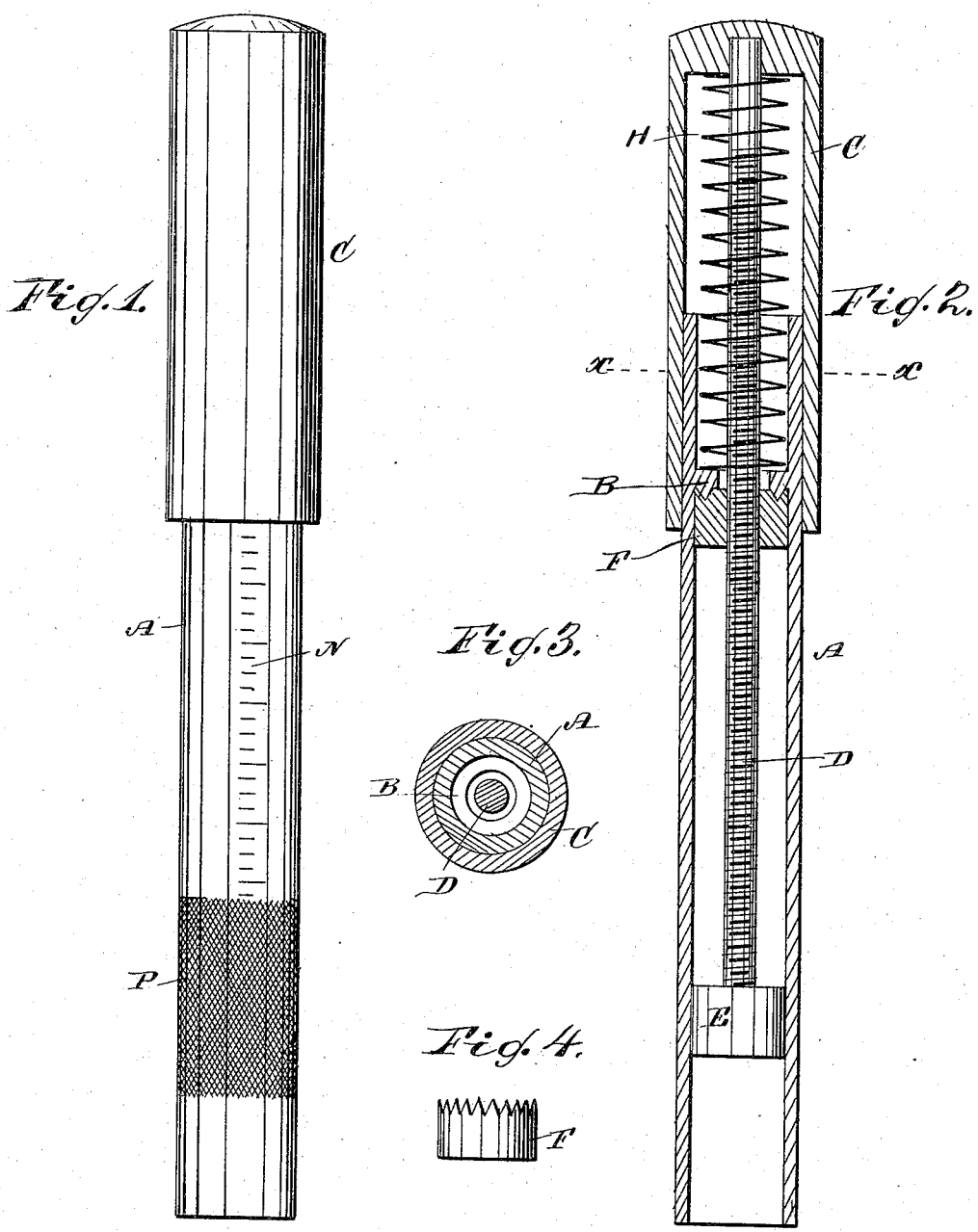
WITNESSES:
INVENTOR:
J. J. Stephens
BY Munn & Co.
ATTORNEYS.

UNITED STATES PATENT OFFICE.

JOSEPH J. STEPHENS, OF COALESBURG, MISSOURI.

INSTRUMENT FOR MEASURING POWDERS.

SPECIFICATION forming part of Letters Patent No. 343,776, dated June 15, 1886.

Application filed September 15, 1885. Serial No. 177,181. (No model.)

*To all whom it may concern:*

Be it known that I, JOSEPH J. STEPHENS, of Coalesburg, in the county of Henry and State of Missouri, have invented a new and Improved Instrument for Measuring Powders, of which the following is a full, clear, and exact description.

The object of my invention is to provide an instrument to facilitate the measuring of powders for medicinal and other purposes, which instrument will measure very exactly and rapidly.

The invention consists in the construction and combination of parts and details, as will be fully described and set forth hereinafter, and then pointed out in the claims.

Reference is to be had to the accompanying drawings, forming part of this specification, in which similar letters of reference indicate corresponding parts in all the figures.

Figure 1 is a side view of my improved instrument for measuring powders. Fig. 2 is a longitudinal sectional view of the same. Fig. 3 is a sectional view of the same on the line $xx$, Fig. 2. Fig. 4 is a detail view of the disk.

The tube A is provided near its upper end with an internal collar, B, having its under side toothed, and on the upper end of the said tube A a cap, C, is mounted to slide, from the closed end of which cap C a screw-rod, D, projects through the tube A, and a collar, B, in the same, and on the lower end of the said rod D a piston, E, is mounted, which piston fits closely in the tube A. The rod D is also screwed through a disk, F, in the tube A, which disk has its upper surface toothed and resting against the toothed under side of the collar B. A spiral spring, H, surrounds the rod D, and is inserted between the collar B of the tube A and the closed end of the cap C. A graduated scale, N, is provided on the outer surface of the tube A, and a roughened or serrated part, P, is formed on the outer surface of the tube A at the lower end.

The instrument is used in the following manner: The open end of the tube A is passed into the powder, which passes into the lower end of the tube up to the piston E. To discharge the powder, the cap is pressed down and the piston E forces out the powder, and is immediately drawn back by the spring H. The quantity of powder taken into the tube each time depends upon the distance from the open end of the tube to the piston E. This distance can be regulated by turning the cap C, for by turning the cap in one direction the piston is moved toward the end of the tube A, and by turning it in the opposite direction the piston is moved from the end of the tube A. These distances can be regulated very easily by means of the scale N. The part P is provided to prevent slipping of the tube A between the fingers. The disk and the collar B are toothed to prevent the disk from turning.

Having thus fully described my invention, I claim as new and desire to secure by Letters Patent—

1. The combination, with the tube A, of the cap C on the same, the rod D, the piston E, and the spring H, substantially as herein shown and described.

2. The combination, with the tube A, having the internal collar, B, of the cap C, the rod D on the same, the piston E on the said rod, and the disk F, rested against the collar B, through which disk the rod D is screwed, substantially as herein shown and described.

3. The combination, with the tube A, having the toothed collar B, of the cap C, the screw-rod D on the same, the piston E on the rod D, and the toothed disk F, through which the rod D is screwed, substantially as herein shown and described.

4. The combination, with the tube A, having the scale N, of the cap C, the rod D, the piston E, and spring H, substantially as herein shown and described.

JOSEPH J. STEPHENS.

Witnesses:
SAM A. MILTON,
C. T. GIVENS.